US012072652B2

(12) United States Patent
Doi

(10) Patent No.: US 12,072,652 B2
(45) Date of Patent: Aug. 27, 2024

(54) IMAGE FORMING APPARATUS

(71) Applicant: Toshiba Tec Kabushiki Kaisha, Tokyo (JP)

(72) Inventor: Yayoi Doi, Mishima Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 23 days.

(21) Appl. No.: 18/163,593

(22) Filed: Feb. 2, 2023

(65) Prior Publication Data

US 2023/0176512 A1 Jun. 8, 2023

Related U.S. Application Data

(63) Continuation of application No. 17/537,740, filed on Nov. 30, 2021, now Pat. No. 11,604,428, which is a continuation of application No. 17/038,751, filed on Sep. 30, 2020, now Pat. No. 11,215,944, which is a continuation of application No. 16/801,519, filed on Feb. 26, 2020, now Pat. No. 10,824,103.

(51) Int. Cl.
*G03G 15/20* (2006.01)

(52) U.S. Cl.
CPC ................................ *G03G 15/2053* (2013.01)

(58) Field of Classification Search
CPC ........... G03G 15/2053; G03G 15/2042; G03G 15/2021; G03G 15/2017; G03G 15/205
See application file for complete search history.

(56) References Cited

U.S. PATENT DOCUMENTS

| | | | |
|---|---|---|---|
| 9,122,212 B2 | 9/2015 | Fujimoto et al. | |
| 9,389,553 B2 | 7/2016 | Yamamoto et al. | |
| 10,054,882 B2 | 8/2018 | Nomura et al. | |
| 10,185,258 B2 | 1/2019 | Sako et al. | |
| 10,649,376 B2 | 5/2020 | Jota et al. | |
| 10,698,349 B1 | 6/2020 | Katsumata | |
| 2013/0070267 A1* | 3/2013 | Kosasa ............. | G03G 15/2042 358/1.9 |

* cited by examiner

*Primary Examiner* — G. M. A. Hyder
(74) *Attorney, Agent, or Firm* — Kim & Stewart LLP

(57) ABSTRACT

An image forming apparatus includes an image forming device that forms images in an image region on a sheet. An image fixing device includes heater elements disposed along a sheet-width direction. A controller is configured to identify a heater element that will overlap with an edge of the image region when a sheet is conveyed to the image fixing device. The controller calculates whether a shift of the image region by a shift amount less than a threshold would cause the heater element to not overlap. If so, the image forming device is controlled to form the image in a shifted image region and only those heater elements in the plurality of heater elements that overlap with the shifted image region are turned on when fixing the sheet if the image has been formed in the shifted image region.

20 Claims, 13 Drawing Sheets

IMAGE FORMING APPARATUS

CROSS-REFERENCE TO RELATED APPLICATIONS

This application is a continuation of U.S. patent application Ser. No. 17/537,740, filed on Nov. 30, 2021, which is a continuation of U.S. patent application Ser. No. 17/038,751, filed on Sep. 30, 2020, now U.S. Pat. No. 11,215,944, issued on Jan. 4, 2022, which is a continuation of U.S. patent application Ser. No. 16/801,519, filed on Feb. 26, 2020, now U.S. Pat. No. 10,824,103, issued on Nov. 3, 2020, the entire contents of each of which are incorporated herein by reference.

FIELD

Embodiments described herein relate generally to an image forming apparatus and a control method.

BACKGROUND

There is an image forming apparatus that includes an on-demand fixing device capable of reducing power consumption used in fixing images to a sheet. At the ends of the fixing device in the main scanning direction, there may be regions through which sheets pass only in some cases, and therefore temperature in these regions may easily increase.

When such temperature increases occur, printing speed or the like may have to be reduced to permit the temperature to decrease. As a result, the performance of the image forming apparatus may deteriorate. If a fan must be provided in the imaging apparatus so that the temperature in these regions of the fixing device does not unwantedly increase, then cost of the image forming apparatus may have to increase.

DETAILED DESCRIPTION

In general, according to an embodiment, an image forming apparatus includes: an image forming device configured to form an image on a sheet in an image region, an image fixing device including a plurality of heater elements disposed along a first direction corresponding to a sheet-width direction of the sheet, and a controller. The controller is configured to identify a heater element in the plurality of heater elements that will overlap with an edge of the image region on a sheet-width direction side when the sheet is conveyed to the image fixing device. The controller then determines whether a shift of the image region in the first direction by a shift amount less than a threshold shift amount would cause the identified heater element to not overlap a shifted image region. The shifted image region, in this context, is shifted on the sheet in the first direction relative to the original image region positioning by the determined shift amount. The image forming device is controlled to form the image in the shifted image region on the sheet, rather than the original image region, when the shift will cause the identified heater to not overlap the shifted image region. The controller provides control to cause only those heater elements in the plurality of heater elements that overlap with the shifted image region to be turned on when fixing the sheet if the image has been formed in the shifted image region.

Figure 1:
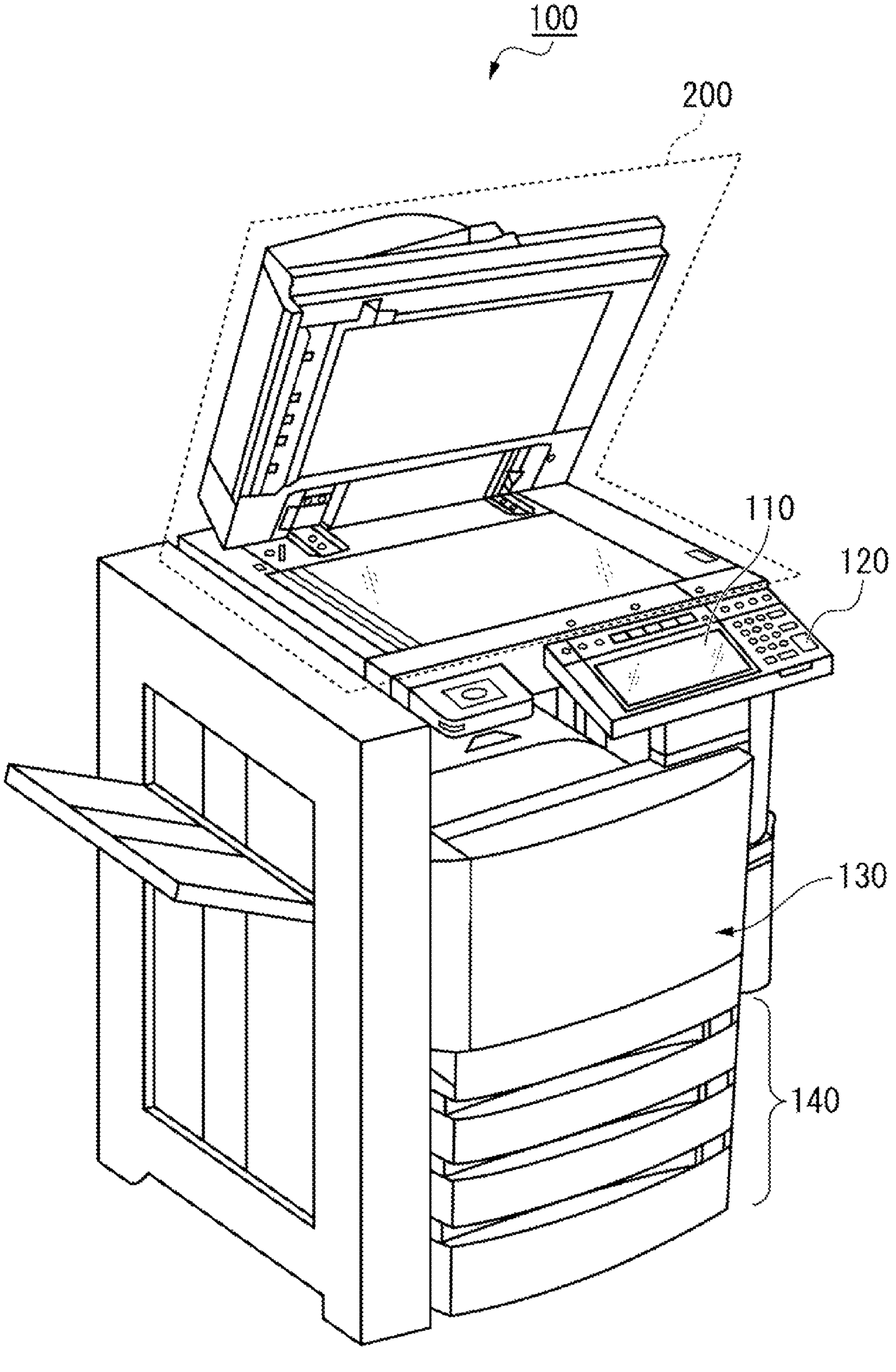
FIG. 1 illustrates an external view of an example of an entire configuration of an image forming apparatus according to an embodiment.
Figure 2:
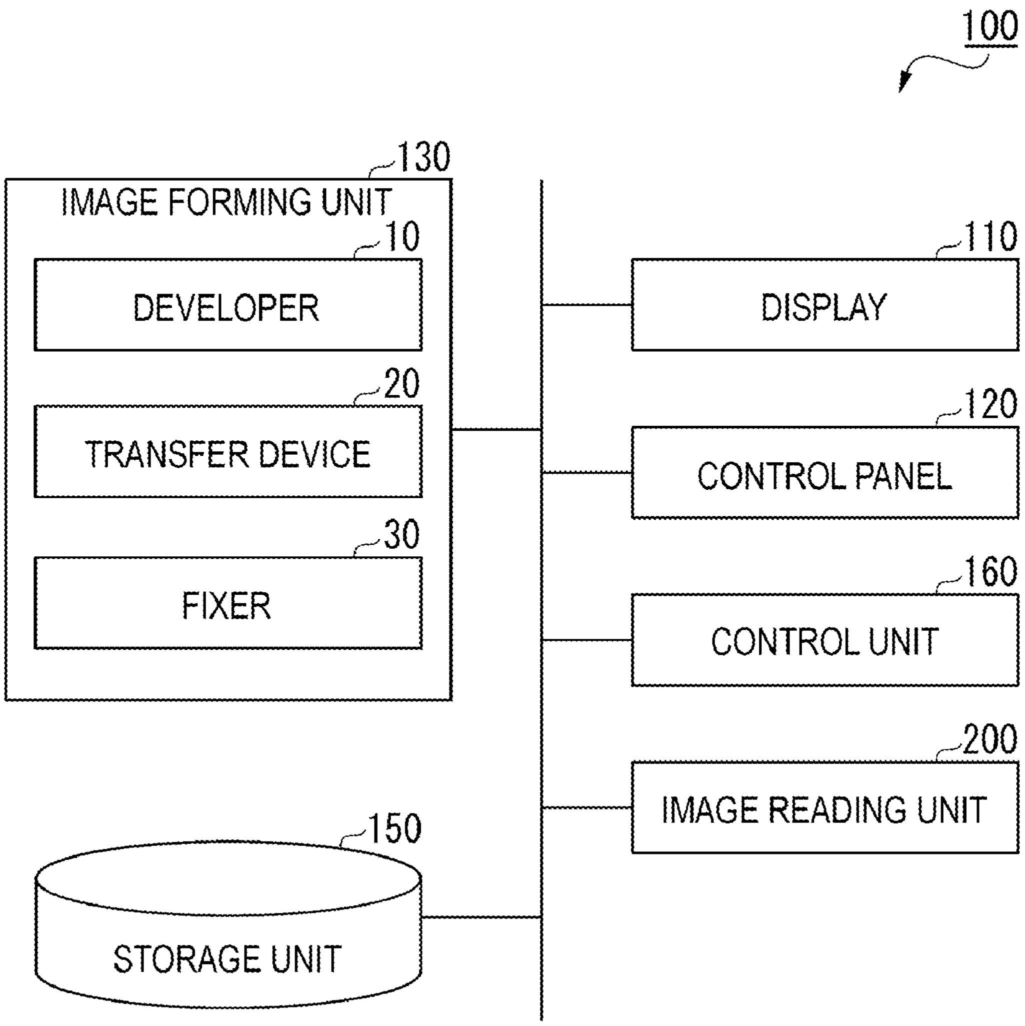
FIG. 2 is a hardware block diagram of an image forming apparatus according to an embodiment.

FIG. 1 illustrates an external view of an example of an entire configuration of an image forming apparatus 100 according to an embodiment. FIG. 2 illustrates a hardware configuration of an image forming apparatus 100 according to an embodiment. The image forming apparatus 100 is, for example, a multi-function peripheral. The image forming apparatus 100 includes a display 110, a control panel 120, an image forming unit 130, a sheet accommodation unit 140, a storage unit 150, a control unit 160, and an image reading unit 200.

The image forming apparatus 100 forms an image on a sheet by using developer such as toner. The developer is fixed to the sheet when heated. The sheet is, for example, a paper or a label sheet. In general, the sheet may be anything so long as the image forming apparatus 100 can form an image on the surface of the sheet.

The display 110 is an image display device such as a liquid crystal display or an organic electro-luminescence (EL) display. The display 110 displays various kinds of information regarding the image forming apparatus 100.

The control panel 120 includes a plurality of buttons. The control panel 120 receives an operation from a user. The control panel 120 outputs a signal in accordance with an operation performed by the user to the control unit 160 of the image forming apparatus 100. The display 110 and the control panel 120 may be configured as an integrated touch panel.

The image forming unit 130 forms an image on a sheet based on image data generated by the image reading unit 200 or image data received via a communication path. The image forming unit 130 may be referred to as an image forming device. The image forming unit 130 includes, for example, a developer 10, a transfer device 20, and a fixer 30 (also referred to as a fixing device).

In one example, the image forming unit 130 forms an image through the following process. The developer 10 of the image forming unit 130 forms an electrostatic latent image on a photoconductive drum. The electrostatic latent image is based on the image data to be printed. The developer 10 forms a visible image by attaching developer material to the electrostatic latent image. A specific example of the developer material is toner. Examples of toner include decolorable toner, non-decolorable toner (normal toner), and decorative toner. There is also a developer material for which an initial color becomes lighter (or disappears) when heated.

In the following description, the developer material in the described example embodiment is a decolorable developer. A decolorable toner is one specific example of a decolorable developer.

The transfer device 20 of the image forming unit 130 transfers the toner image formed by the developer 10 to a sheet. The transfer device 20 is an example of a transfer unit. The fixer 30 of the image forming unit 130 fixes the visible toner image to a sheet by heating and pressing the sheet. The sheet on which an image is formed may be a sheet that has been accommodated in the sheet accommodation unit 140 or otherwise may be a manually fed sheet.

The sheet accommodation unit 140 stores sheets to be used by the image forming unit 130 for printing.

The storage unit 150 comprises a storage device such as a magnetic hard disc device (HDD) or a semiconductor storage device. The storage unit 150 stores various data necessary for operations of the image forming apparatus 100. The storage unit 150 may temporarily store data for an image to be formed by the image forming apparatus 100.

The control unit 160 is configured using a processor such as a central processing unit (CPU) and a memory. The control unit 160 may be also referred to as a controller. The control unit 160 reads and executes a program stored in the storage unit 150. The control unit 160 controls operations of in the various components of the image forming apparatus 100.

Figure 3:
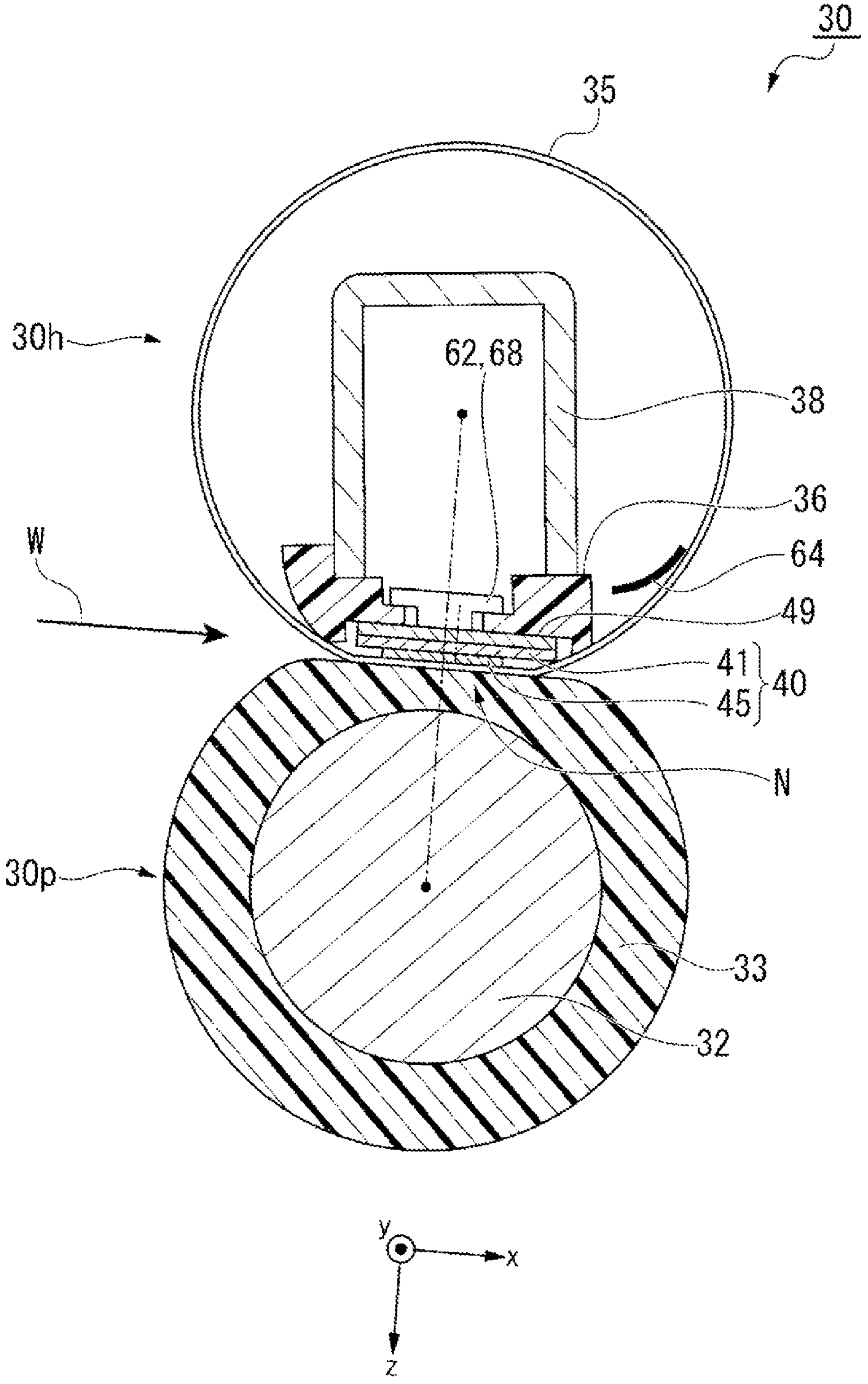
FIG. 3 illustrates a cross-sectional view of a fixer.

The control unit 160 controls the power supplied to a heating body group 45 (illustrated in FIG. 3). The power may be controlled by controlling, specifically, a conduction amount. The controlling of the conduction amount may be realized, for example, through phase control or may be realized by frequency control.

The image reading unit 200 obtains reading target image data from a reading target based on brightness and darkness of light reflected from the reading target. The image reading unit 200 records the obtained image data. The recorded image data may be transmitted to another information processing apparatus via a network. The recorded image data may be formed as an image on a sheet by the image forming unit 130. The image reading unit 200 may include an auto document feeder (ADF).

FIG. 3 is a cross-sectional view illustrating the fixer 30 according to the embodiment. The fixer 30 includes a pressurization roller 30*p* and a film unit 30*h*.

The pressurization roller 30*p* is configured to press the surface of the film unit 30*h* and is rotatably driven. The pressurization roller 30*p* forms a nip N with the film unit 30*h* when pressed to the surface of the film unit 30*h*. The pressurization roller 30*p* applies pressure to the sheet entering the nip N. When the pressurization roller 30*p* is rotated, the pressurization roller 30*p* conveys the sheet along with the rotation. The pressurization roller 30*p* includes, for example, a core metal 32 and an elastic layer 33, and a release layer (not separately illustrated).

The core metal 32 is a cylindrical shape of a metal such as stainless steel. Both ends of the core metal 32 in an axial direction are supported to be rotatable. The core metal 32 is rotatably driven by a motor. The core metal 32 comes into contact with a cam member or the like.

The elastic layer 33 is formed of an elastic material such as silicone rubber. The elastic layer 33 is formed to have a constant thickness on the outer circumferential surface of the core metal 32. The release layer can be formed on the outer circumferential surface of the elastic layer 33. The release layer is formed of a resin material such as a PFA (a tetrafluoroethylene perfluoroalkylvinylether copolymer).

A fixing belt 35 of the film unit 30*h* is rotated to match with rotation of the pressurization roller 30*p* when the pressurization roller 30*p* is forming the nip N with the fixing belt 35. The fixing belt 35 is formed as a cylindrical thin film. The pressurization roller 30*p* is rotated to move the sheet in a conveyance direction W through the nip N.

The film unit 30*h* heats the sheet entering the nip N. The film unit 30*h* includes the fixing belt 35, a heater unit 40, a heat transfer member 49, a support member 36, a stay 38, a heater thermometer 62, a thermostat 68, and a film thermometer 64.

The fixing belt 35 includes a base layer, an elastic layer, and a release layer in order from the inner circumferential side. The base layer is a material such as nickel (Ni). The elastic layer is on the outer circumferential surface of the base layer. The elastic layer comprises an elastic material such as silicone rubber. The release layer is on the outer circumferential surface of the elastic layer. The release layer is formed of a material such as PFA resin.

Figure 4:
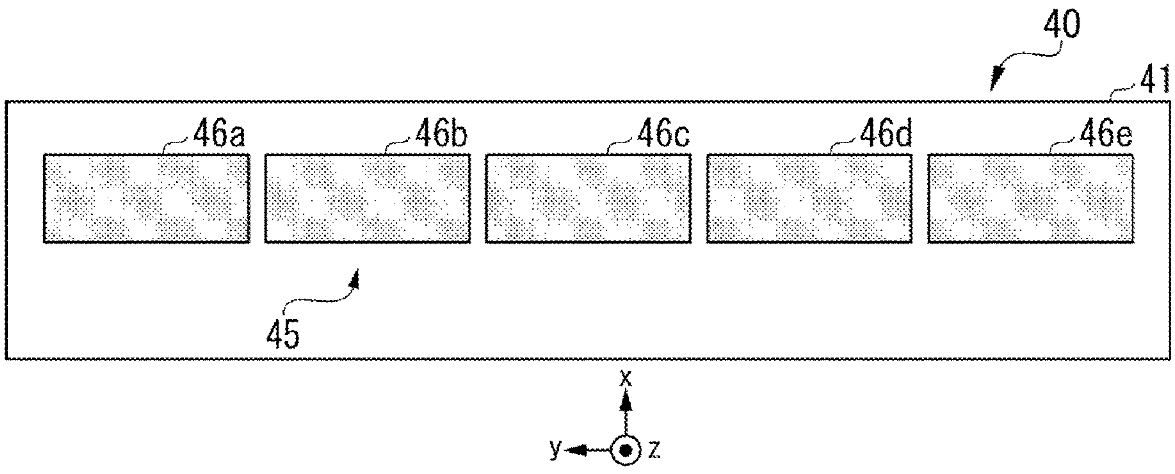
FIG. 4 illustrates a schematic plan view of a heater unit.

FIG. 4 is a schematic view illustrating the heater unit 40. The heater unit 40 is an example of a resistive heater. The heater unit 40 is provided downstream from the transfer device 20 in the conveyance direction of the sheet.

The heater unit 40 includes a heating body substrate 41 and the heating body group 45. The substrate 41 is formed of a metal material such as stainless steel or nickel or a ceramic material such as aluminum nitride. The substrate 41 is formed in a long thin rectangular plate shape. The substrate 41 is disposed inside in a radial direction of the fixing belt 35. For the substrate 41, the axial direction of the fixing belt 35 is assumed to be a longitudinal direction.

The heating body group 45 is formed on the surface of the substrate 41. The heating body group 45 includes a plurality of heating bodies (e.g., 46*a*, 46*b*, 46*c*, 46*d*, 46*e*). Each of the plurality of heating bodies may be referred to as a heater element. The heating bodies 46*a* to 46*e* are each an example of a heating unit that heats a sheet. Each heating body 46*a* to 46*e* comprises a heating resistor of a material such as a silver-palladium alloy. In the example of FIG. 4, the heating body group 45 includes five heating bodies 46*a* to 46*e*. For each heating body 46*a* to 46*e*, the conduction amount can be independently controlled by the control unit 160. As illustrated in FIG. 4, the heating bodies 46*a* to 46*e* are provided along a width direction (sheet width direction) orthogonal to the conveyance direction.

As illustrated in FIG. 3, the heater unit 40 is disposed inside the fixing belt 35 (that is, within region surrounded by the fixing belt 35 loop). A lubricant is typically applied on the inner circumferential surface of the fixing belt 35. The heater unit 40 comes into contact with the inner circumferential surface of the fixing belt 35 via the lubricant. When the heater unit 40 generates heat, the viscosity of the lubricant generally decreases. As a result, friction between the heater unit 40 and the fixing belt 35 is reduced. The fixing belt 35 is a belt-like thin film that slides along the surface of the heater unit 40.

The support member 36 is formed of a resin material such as a liquid crystal polymer. The support member 36 supports the heater unit 40. The support member 36 also supports the inner circumferential surface of the fixing belt 35 at both ends of the heater unit 40.

The stay 38 is formed of a steel sheet metal or the like. The cross-section of the stay 38 may be formed in, for example, a U shape. The stay 38 is mounted so that an opening of the U shape meets the support member 36. Both ends of the stay 38 are fixed to a housing of the image forming apparatus 100. As a result, the film unit 30*h* is supported by the image forming apparatus 100 via the stay 38.

The heater thermometer 62 is disposed near the heater unit 40. The heater thermometer 62 measures a temperature of the heater unit 40.

The thermostat 68 is disposed similarly to the heater thermometer 62. The thermostat 68 functions to block conduction to (e.g., switch off) the heating body group 45 when the measured temperature of the heater unit 40 exceeds a predetermined temperature threshold.

Figure 5:
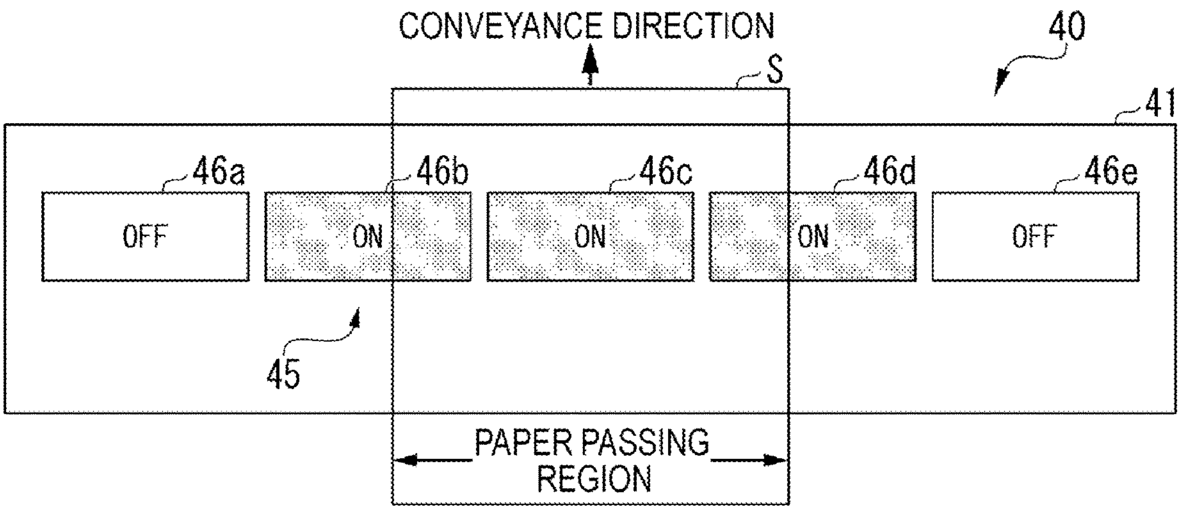
FIG. 5 is a diagram illustrating a positional relationship between a heater unit and a sheet of a certain size during of normal control.
Figure 6:
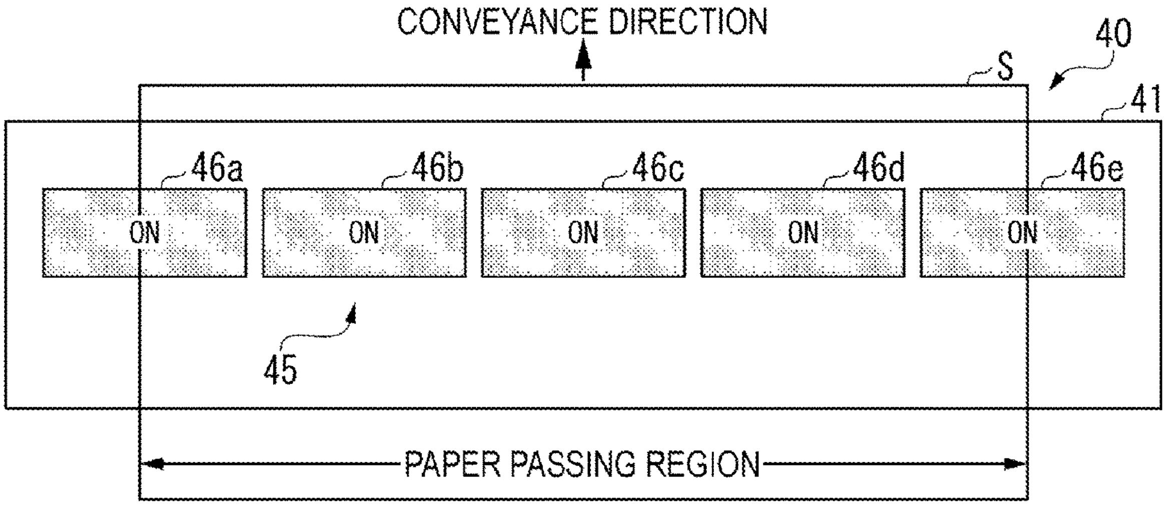
FIG. 6 is a diagram illustrating a positional relationship between a heater unit and a sheet of another size during.

The control unit 160 performs normal control and special control of the heating bodies 46*a* to 46*e*. First, the normal control will be described. FIGS. 5 and 6 are diagrams to explain the normal control. In the normal control, the control unit 160 specifies which of the heating bodies 46*a* to 46*e* are corresponding to outer edges of the sheet (or an image region thereon) in the width direction as the end heating members. The control unit 160 heats the end heating members and any heating body 46*a* to 46*e* interposed between the end heating members. That is, the heating bodies 46*a* to 46*e* corresponding to a region through which the sheet passes are heated.

In the following description, the region through which the sheet passes is referred to as a "paper passing region" in some cases. Heating with a heating body 46*a* to 46*e* is referred to as "turning on" the heating body in some cases. Setting the conduction amount to zero for a heating body 46*a* to 46*e* and thus not utilizing the heating body a heater is referred to as "turning off" the heating body 46*a* to 46*e* in some cases.

The depicted size of a sheet S is different between FIGS. 5 and 6. In FIG. 5, the end heating members are the heating bodies 46*b* and 46*d*. The heating body interposed between the end heating members is the only heating body 46*c*. The control unit 160 heats with the heating bodies 46*b*, 46*c*, and 46*d*. The heating bodies 46*b*, 46*c*, and 46*d* are the heating bodies corresponding to the paper passing region.

In FIG. 6, the end heating members are the heating bodies 46*a* and 46*e*. The heating bodies interposed between the end heating members are the heating bodies 46*b*, 46*c*, and 46*d*. The control unit 160 heats with the heating bodies 46*a*, 46*b*, 46*c*, 46*d*, and 46*e*. The heating bodies 46*a*, 46*b*, 46*c*, 46*d*, and 46*e* are the heating bodies corresponding to the paper passing region.

In this way, in the normal control, the heating bodies 46*a* to 46*e* are controlled in accordance with the size of a sheet being printed. In the special control, heating control is performed not only in accordance with not the size of a sheet being printed but also according to an image formed on the sheet, and image data obtained by shifting or shrinking the image is generated.

The special control will be further described. In the special control, the control unit 160 determines one of the heating bodies 46 that is supposed to face an end of an image region on a sheet in the sheet width direction, as end heating bodies. The control unit 160 then determines whether the end heating body could be turned off by shifting the image region on the sheet or shrinking at least part of the image region to avoid having to use the end heating body. When the control unit 160 determines that the end heating body can be turned off, the control unit 160 shifts the image or shrinks the predetermined region of the image region and thus does not heat with the end heating body. The special control also includes control by which a heating member is not turned on if there is no toner image in a region of a sheet corresponding in position to that heating member.

Figure 7:
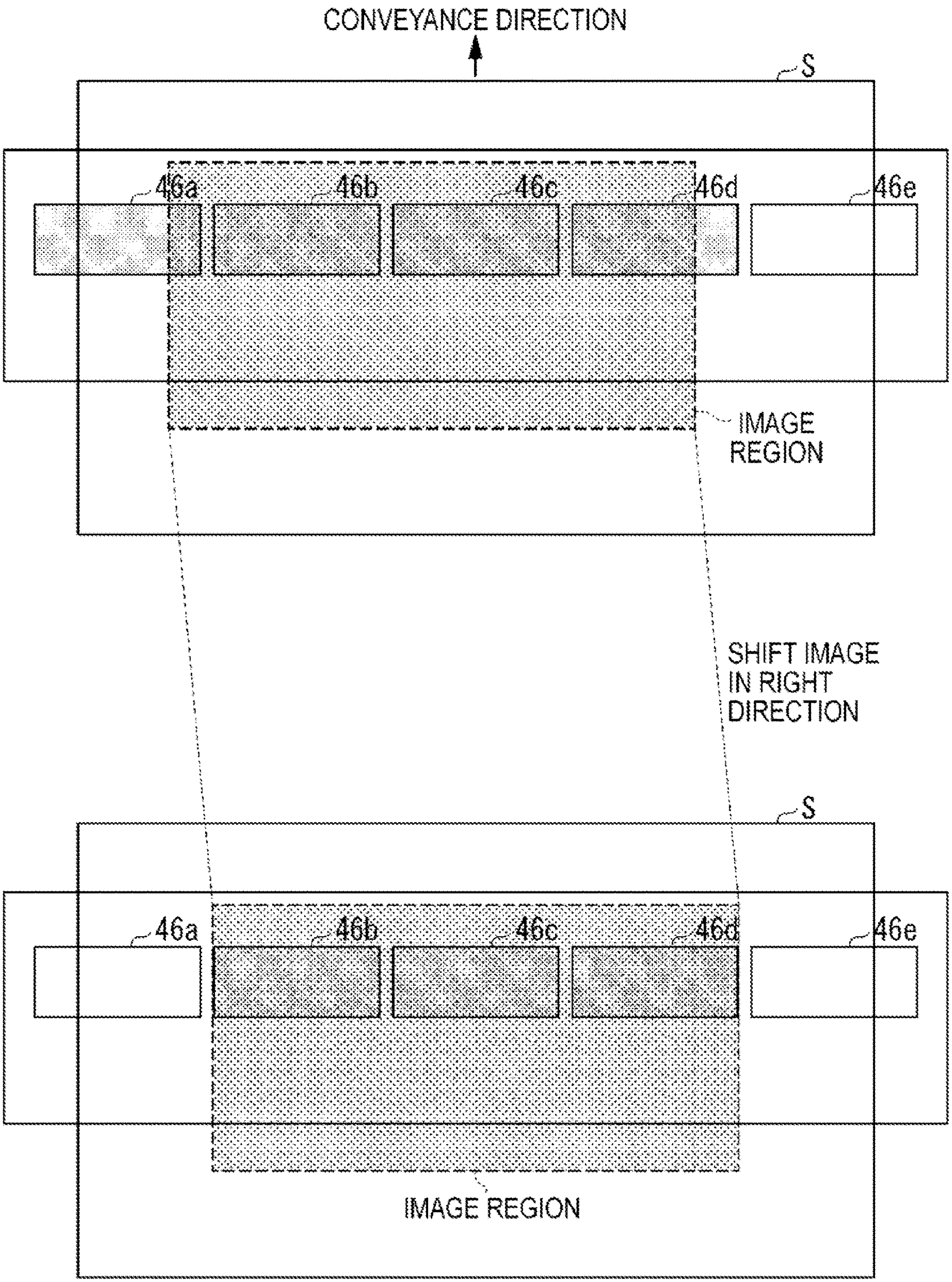
FIG. 7 is a diagram illustrating a positional relationship between a heater unit and a sheet before and after an image region shift.

FIG. 7 is a diagram illustrating an example of an image region shift performed in the special control. In this context, "shift" means that an image region is positionally shifted in a direction orthogonal to the conveyance direction of a sheet. The direction orthogonal to the conveyance direction of the sheet is a sub-scanning direction. In FIG. 7, a halftone (gray shaded) portion surrounded by a dashed line indicates the image region in which an image will be formed on a sheet. Before the image is shifted (see top portion of FIG. 7), the heating bodies 46*a*, 46*b*, 46*c*, and 46*d* correspond to the image region (that is, the image region overlaps at least a portion of each). Of these heating bodies, the heating bodies 46*a* and 46*d* correspond to ends of the image region. However, in this example, the control unit 160 performs control to shift the position of the image to the right (see bottom portion of FIG. 7). Thus, the image region is shifted to the right so that the image region only overlaps heating bodies 46*b*, 46*c*, and 46*d*.

That is, after the image region has been shifted, only the heating bodies 46*b*, 46*c*, and 46*d* correspond to the image region. Therefore, the control unit 160 can turn off the heating body 46*a* since it is no longer necessary in the fixing of the image region. When the heating body 46*a* is turned off, an increase in temperature is suppressed.

The control unit 160 may also limit a total shift amount to a predetermined shift amount. Specifically, when the shift amount necessary to permit the turn off of an ending heating body 46 is equal to or less than a given amount, only then may the control unit 160 perform shifting. Otherwise, the control unit 160 may not perform shifting. This is because when the shift amount is large, a shifted position of the image region becomes too far from the position of an original image region. Specifically, for example, when the shift amount is expressed as a number of dots in the main scanning direction and the necessary number of dots to be shifted is equal to or less than N dots, shifting may be performed. When the necessary number of dots is greater than the N dots, shifting may not be performed. In the following description, when a shift amount is limited in this manner, the range of the shiftable shift amount is referred to as a shift-permitted range in some cases.

Next, an example of an image region shrink or reduction performed in the special control will be described. Control for an image region shrink includes the control by which a partial region (sub-portion) of an image region is shrunk and control by which an entire image region is shrunk. First, the control in which a partial region of an image region is shrunk will be described.

Figure 8:
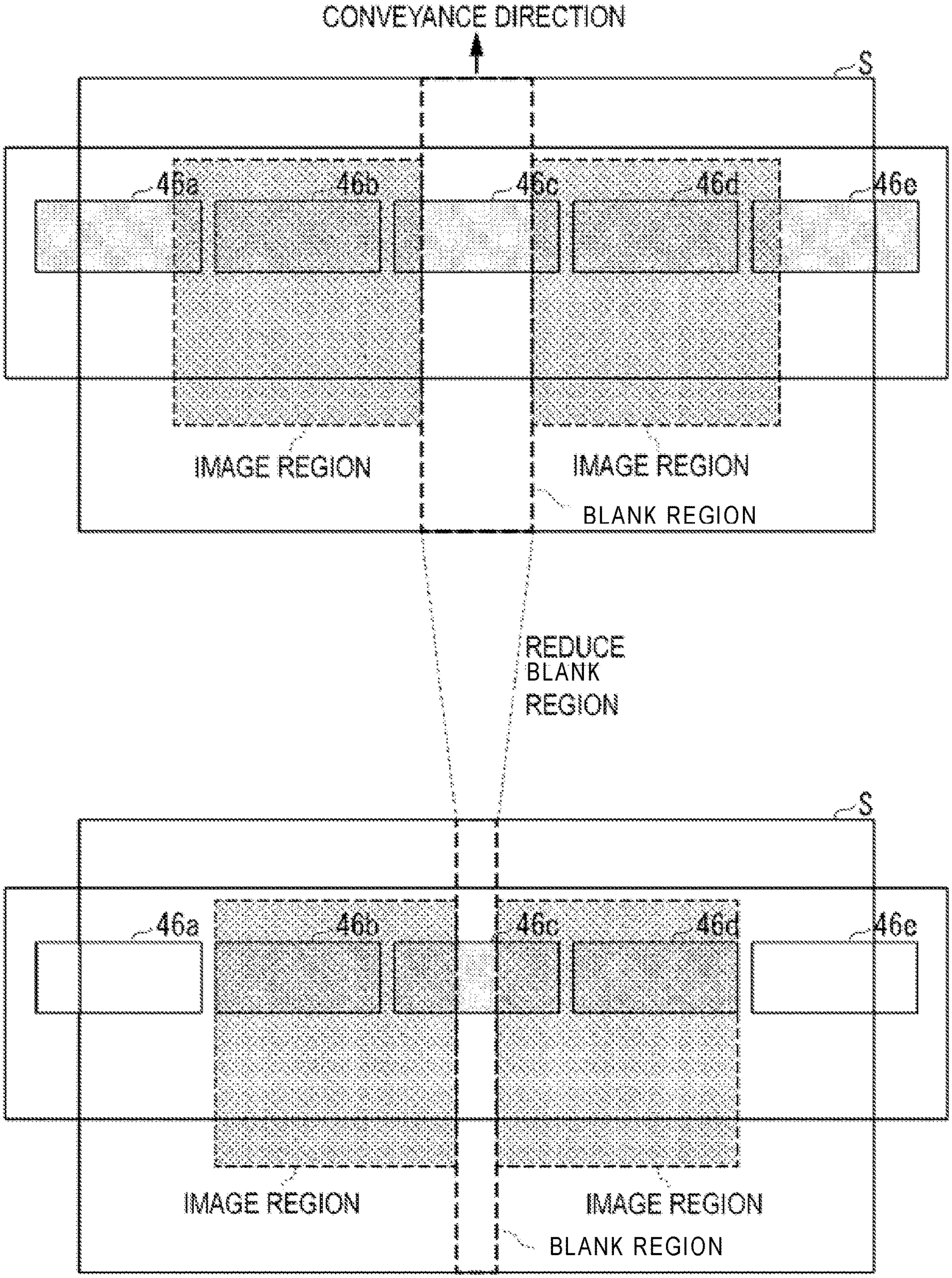
FIG. 8 is a diagram illustrating a positional relationship between a heater unit and a sheet before and after an image portion shrink.

FIG. 8 is a diagram illustrating an example of a shrink of a partial region of an image region performed in the special control. As a partial region of an image region, a region ranging from an upstream-side end to a downstream-side end in the conveyance direction of a sheet can be exemplified. By setting this region as a predetermined region and reducing the length of the sheet in the width direction (and not the length in the conveyance direction), it is determined whether an end heating member can be turned off. The region is also referred to as a shrink target region. As the shrink target region, a region including no toner image can be exemplified. A shrink target region in which no toner image is formed is also referred to as a "blank region" in some cases.

In FIG. 8, a blank region is illustrated as a region interposed between two sub image regions. The blank region is a region that ranges from an upstream-side end to a downstream-side end in the conveyance direction of the sheet S. As a specific example of the blank region, a region in a middle portion of the sheet provided when images corresponding to a plurality of pages such as two pages are printed on one sheet can be exemplified.

Before the blank region is reduced, the heating bodies 46*a*, 46*b*, 46*c*, 46*d*, and 46*e* correspond to the image region, as illustrated in FIG. 8. Of these heating bodies, the heating bodies 46*a* and 46*e* at the outer ends the image regions. The control unit 160 shrinks the blank region in the main scanning direction to reduce the interval between the sub image regions.

Thus, now the heating bodies 46*b*, 46*c*, and 46*d* correspond to the image region(s). The control unit 160 can turn off the heating bodies 46*a* and 46*e*. By turning off the heating bodies 46*a* and 46*e*, an increase in temperature is suppressed.

The shrink target region may be a region in which a toner image of the same toner is formed. Here, the same toner is, for example, a toner in which each toner ratio of CMYK is the same. Accordingly, the region in which the toner image of the same toner is formed is a region in which color is uniform. This region may be referred to as a uniform toner region.

Figure 9:
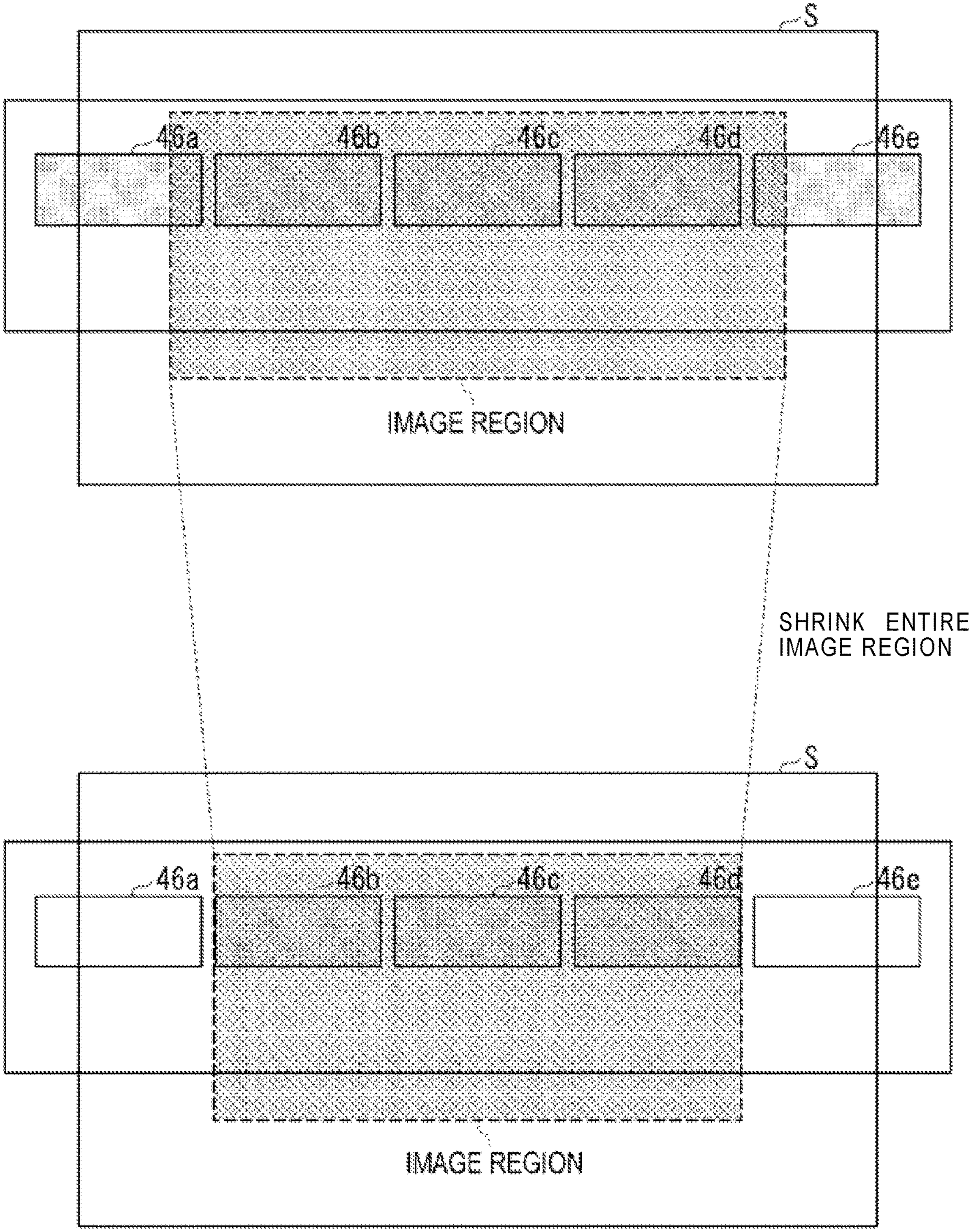
FIG. 9 is a diagram illustrating a positional relationship between a heater unit and a sheet before and after an entire image region shrink.

FIG. 9 is a diagram illustrating an example of a shrink of an entire image region performed in the special control. Before the shrink, the heating bodies 46*a*, 46*b*, 46*c*, 46*c*, 46*d*, and 46*e* correspond to the image region. Of these heating bodies, the heating bodies 46*a* and 46*e* at the outer ends of the image region. So the heating bodies 46*a* and 46*e* can be turned off, the control unit 160 reduces the entire image region. In an embodiment, an aspect ratio of the entire image region is maintained through the shrink.

As a result, only the heating bodies 46*b*, 46*c*, and 46*d* no correspond to the image region. The control unit 160 can turn off the heating bodies 46*a* and 46*e*. By turning off the heating bodies 46*a* and 46*e*, an increase in temperature is suppressed.

The control unit 160 may limit the amount (or ratio) of the shrink to a predetermined amount (or ratio). That is, the control unit 160 may determine whether to perform the shrink in accordance with a shrink amount necessary to permit the turn off of heating bodies 46 at the outer ends. It is assumed that the larger a shrink amount is, the smaller the resulting image will be. Accordingly, for example, when dots in the main scanning direction are designated for shrink, a large shrink amount indicates a large number of designated dots. On the other hand, when an image region is shrunk based on a shrink ratio, a large shrink amount indicates a small shrink ratio. In the following description, a range of an applicable shrink amount is also referred to as a shrink-permitted range in some cases.

Figure 10:
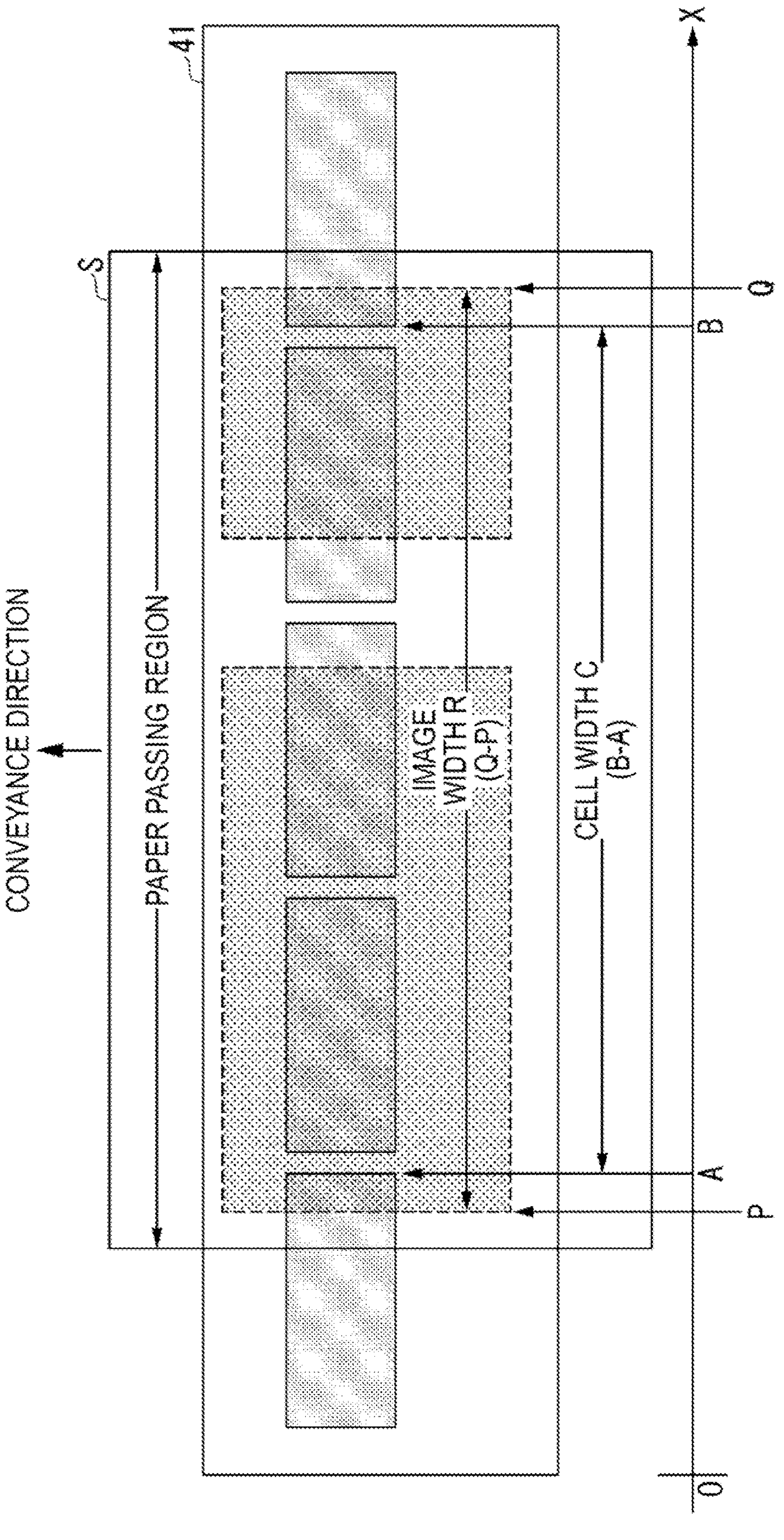
FIG. 10 is a diagram a positional relationship between a heater unit and a sheet to explain a control method according to an embodiment.

FIG. 10 is a diagram to explain a control method. In FIG. 10, an X axis is parallel to the main scanning direction, the X coordinates A and B of the heating bodies 46 at the outer ends of the image region, and coordinates P and Q of the outer ends of image region(s) in the main scanning direction are illustrated. The coordinates P are the minimum coordinate of the image region(s) along the main scanning direction and the coordinates Q are the maximum coordinates of the image region(s) along the main scanning direction. In FIG. 10, the value Q-P is assumed to be an image width R and the value B-A is assumed to be a cell width C.

Figure 11:
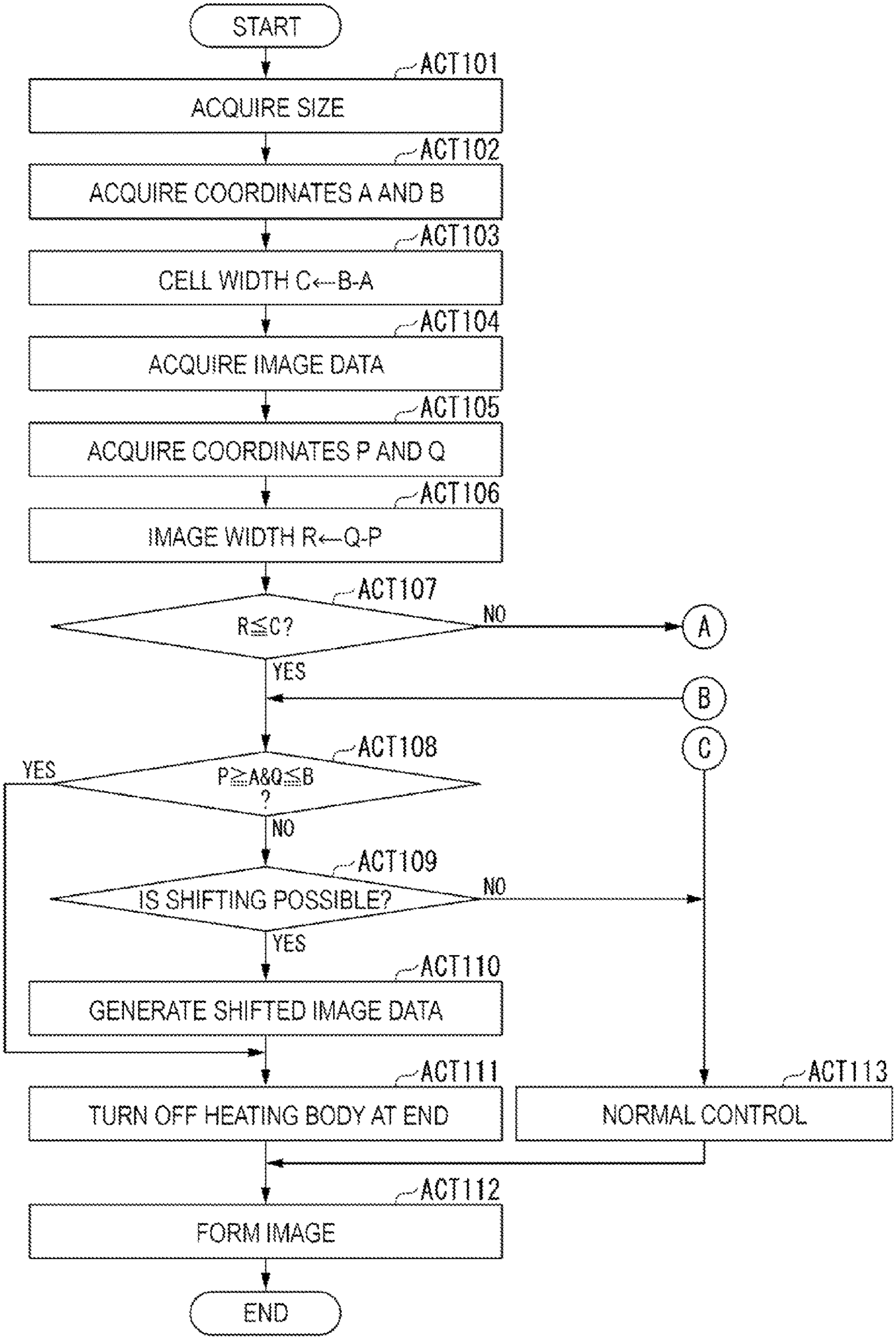
FIGS. 11 and 12 are flowcharts illustrating a flow of control by a control unit.

A control method will be described using respective coordinates illustrated in FIG. 10. FIG. 11 is a flowchart illustrating a flow of control by the control unit 160. The flowchart illustrates a flow of a process when an image is formed on one sheet. Accordingly, when an image is to be formed on a plurality of sheets, the process is repeatedly performed for every sheet. The flowchart of FIG. 11 illustrates a process when possible shift and shrink are limited.

The control unit 160 acquires the size of a sheet when the control unit 160 receives a request to form an image, such as a copy (ACT 101). The control unit 160 acquires the X coordinates A and B of the heating bodies 46 at the ends (ACT 102). The heating bodies 46 corresponding to the ends are specified by the size of the sheet. The coordinates of each heating body 46 are stored in the storage unit 150 in advance. The control unit 160 calculates B-A as the cell width C (ACT 103).

The control unit 160 acquires image data indicating an image to be formed on the sheet (ACT 104). The control unit 160 acquires the coordinates P and Q of the ends of the image region in the main scanning direction from the image data (ACT 105). The control unit 160 calculates Q-P as the image width R (ACT 106).

The control unit 160 determines whether the image width R is equal to or less than the cell width C (ACT 107). When the image width R is equal to or less than the cell width C (YES in ACT 107), the control unit 160 determines whether the coordinates P are equal to or greater than the coordinates A and the coordinates Q are equal to or less than the coordinates B (ACT 108). In this determination, the control unit 160 determines whether the heating bodies 46 at the ends could be turned off (left unused) even if the special control is not performed.

When the coordinates P are equal to or greater than the coordinates A and the coordinates Q are equal to or less than the coordinates B (YES in ACT 108), the control unit 160 turns off the heating bodies 46 at the ends (ACT 111). Here, when there are other heating bodies 46 even further outside of the specified heating bodies 46 at the ends, then these other heating bodies 46 are, of course, also turned off. The control unit 160 forms the image (ACT 112), and then the process ends.

A negative determination ("No") in ACT 108 means that the coordinates P are less than the coordinates A and the coordinates Q are greater than the coordinates B. This indicates that the image width R is equal to or less than the cell width C and the image region corresponds to one of the heating bodies 46 at two ends. In this case, by shifting the image, the coordinates P can be set to be equal to or greater than the coordinates A and the coordinates Q can be set to be equal to or less than the coordinates B.

The control unit 160 determines whether the shifting is possible (ACT 109). Specifically, the control unit 160 determines whether a shift amount necessary to turn off the heating bodies 46 at the ends is within the shift-permitted range. When the shifting is possible (YES in ACT 109), the control unit 160 generates the shifted image data (ACT 110). The control unit 160 turns off the heating bodies 46 at the ends (ACT 111). Here, if heating bodies 46 are further outside of the specified heating bodies 46 at the ends, these outer heating bodies 46 are, of course, controlled to be turned off. The control unit 160 forms the image based on the shifted image data (ACT 112) and ends the process.

When the shifting is not possible in ACT 109 (NO in ACT 109), the control unit 160 performs normal control in which the heating bodies 46 corresponding to the paper passing region are heated (ACT 113). The control unit 160 forms the image based on the image data (ACT 112) and ends the process.

Figure 12:
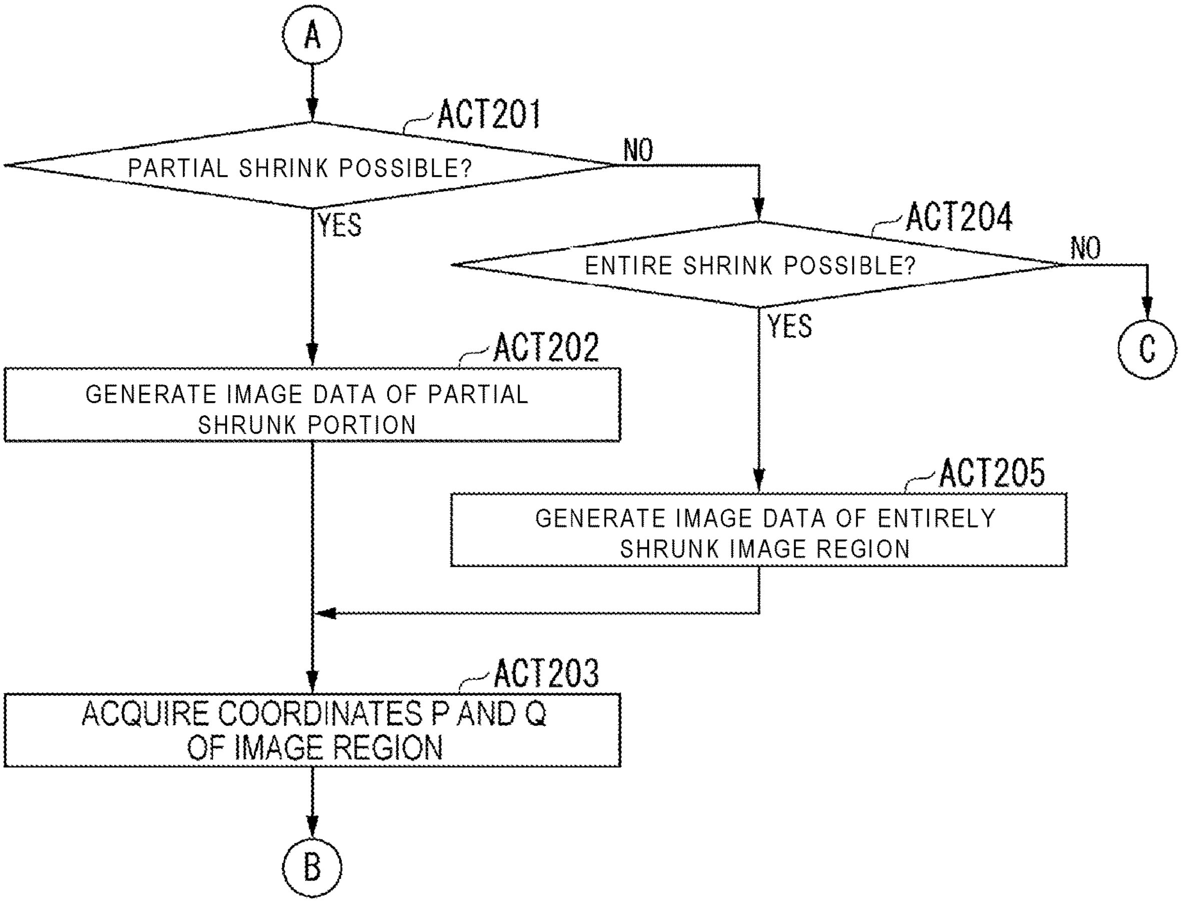

When the image width R is not equal to or less than the cell width C in ACT 107 (NO in ACT 107), the control unit 160 causes the process to move to ACT 201 of FIG. 12. In ACT 201 of FIG. 12, the control unit 160 determines whether the shrink is possible (ACT 201). Specifically, when there is a shrink target region, a shrink amount is within the shrink-permitted range, the control unit 160 determines whether the image width R is equal to or less than the cell width C.

When it is determined that the shrink is possible (YES in ACT 201), the control unit 160 generates the image data with the shrunk image part (ACT 202). In this way, the image data in which the image width R is equal to or less than the cell width C is generated. However, the minimum coordinates P of the image region in the main scanning direction may not necessarily be equal to or greater than the coordinates A and the maximum coordinates Q of the image region in the main scanning direction may not necessary be equal to or less than the coordinates B.

The control unit 160 acquires the coordinates P and Q of the image region of the image indicated by the image data of the shrunk image region (ACT 203) and causes the process to move to ACT 108 of FIG. 11. In ACT 108, it is determined whether the coordinates P are equal to or greater than the coordinate A and the coordinates Q are equal to or less than the coordinates B. When the determination is negative, the above-described shifting is performed.

When it is determined in ACT201 that the shrink is not possible (NO in ACT 201), the control unit 160 determines whether the entire image region can be shrunk (ACT 204). Specifically, the control unit 160 determines whether a shrink amount necessary to turn off the heating bodies 46 at the ends is within the shrink-permitted range (ACT 204).

When it is determined that the shrink is possible (YES in ACT 204), the control unit 160 generates image data corresponding to a shrunk image region (ACT 205). In this way, the image data in which the image width R is equal to or less than the cell width C is generated. However, the minimum coordinates P of the image region in the main scanning direction may not necessarily be equal to or greater than the coordinates A and the maximum coordinates Q of the image region in the main scanning direction may not necessarily be equal to or less than the coordinates B.

The control unit 160 acquires the coordinates P and Q of the image region indicated by the image data of the shrunk image region (ACT 203) and causes the process to move to ACT 108 of FIG. 11. In ACT 108, it is determined whether the coordinates P are equal to or greater than the coordinates A and the coordinates Q are equal to or less than the coordinates B. When the determination is negative, the above-described shifting is performed.

When it is determined in ACT 204 that the shrink is not possible (NO in ACT 204), it is determined that neither the shifting nor the shrink is possible. The control unit 160 performs the normal control in which the heating bodies 46 corresponding to the paper passing region are heated (ACT 113). The control unit 160 forms the image based on the image data (ACT 112) and ends the process.

Figure 13:
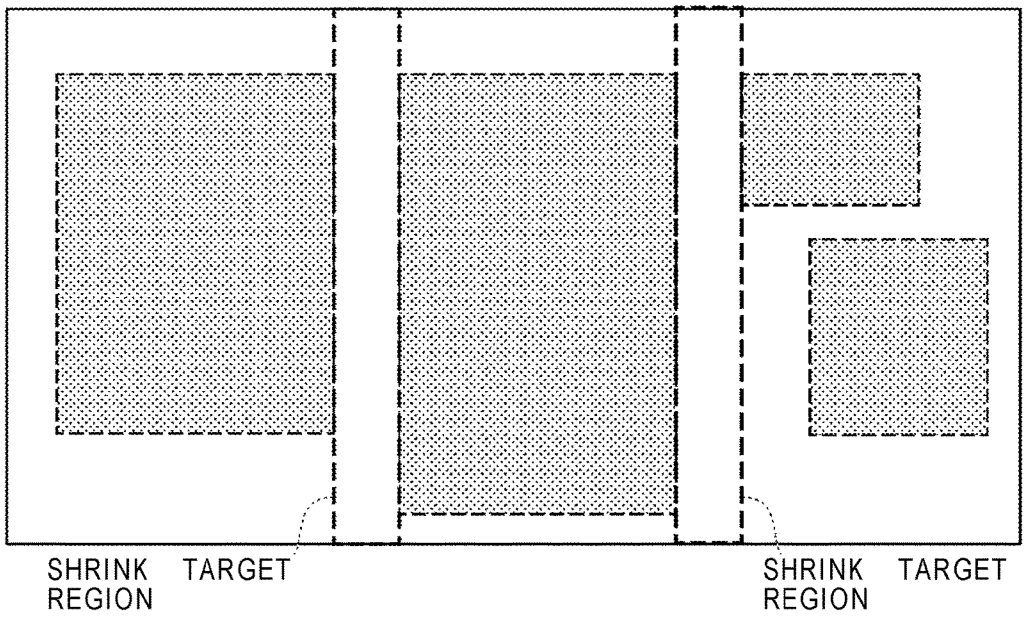
FIG. 13 is a diagram illustrating examples of parts of an image region that are subjected to an image portion shrink.

FIG. 13 is a diagram illustrating examples of shrink target regions. In FIG. 13, a halftone portion indicates an image region in which an image is formed on a sheet. As illustrated in FIG. 13, the number of shrink target regions may be 2 or more. By setting a plurality of regions as the shrink target regions, the shrink can be performed more efficiently. As a result, the control unit 160 can cause the heating bodies 46 at the ends to remain unheated (off).

Figure 14:
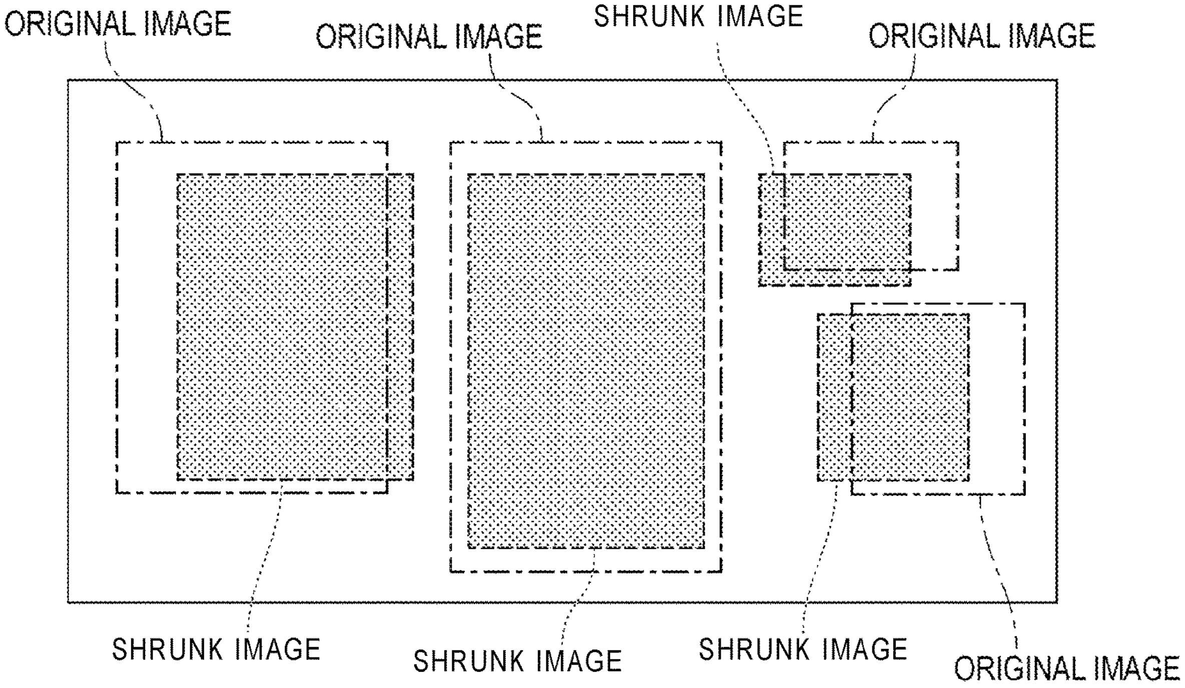
FIG. 14 is a diagram illustrating a difference before and after an entire image region shrink.

FIG. 14 is a diagram illustrating an example when the entire image region is shrunk. In FIG. 14, halftone portions indicate shrunk images and portions surrounded by one-dot dashed lines indicate images before the shrink. As illustrated in FIG. 14, image widths can be shortened after the shrink. As a result, the control unit 160 can cause the heating bodies 46 at the ends to be unheated.

Figure 15:
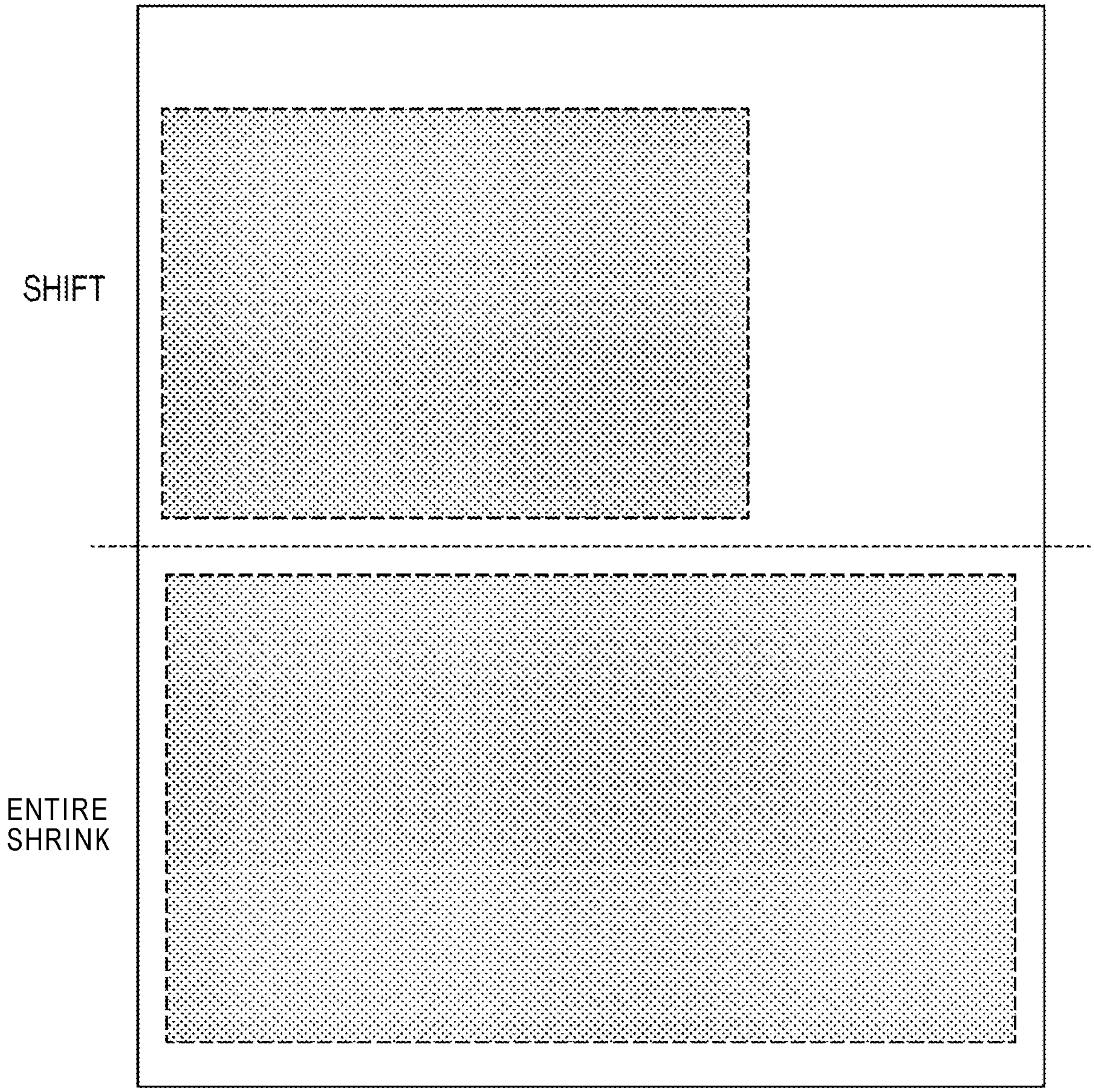
FIG. 15 is a diagram illustrating an example in which a sheet is divided into two regions, upper and lower parts, in a sheet conveyance direction and different control methods are applied, respectively.

Next, an example in which an image region is divided into a plurality of regions and the special control is performed on each of the divided regions will be described. FIG. 15 is a diagram illustrating an example in which a sheet is divided into two regions, upper and lower parts, and the special control is performed for the upper and lower parts, respectively. The control unit 160 shifts the image of the upper half to the right side and entirely shrinks the image of the lower half. In this way, by shifting the image or shrinking the predetermined region of the image for each of the divided regions, the control unit 160 can cause the heating bodies 46 at the ends to be turned off. In the example of FIG. 15, the number of divided regions is 2, but the region may be divided into two or more regions in accordance with an image.

In the above-described example embodiment, the shrink in the blank region and the shrink in the entire image region have been described. In the example, a shrink amount is not necessarily limited. A preferred configuration of a shrink amount will be described. When selecting between a possible shrink amount of the blank region and a possible shrink amount of the entire image region, it is typically preferable that the shrink amount of the entire image region be as small as possible.

The reason for this preference is that the blank region is a region in which nothing is written, so the influence of the shrinking on the resulting image is relatively insignificant although the shrink amount can be relatively large. Conversely, the influence of the shrinking of the entire image region on the resulting image is typically more significant. Accordingly, when different combinations of shrink levels and types are available between the shrink amount of the blank region and the shrink amount of the entire image region, the selected shrink amount of the entire image region is preferably small when possible. As an example of a possible shrink amount in the blank region, a shrink ratio of 90% or more can be exemplified. As an example of the shrink amount of the entire image region, a shrink ratio of 99% or more can be exemplified.

A shrink amount may be able to be set. By setting a shrink amount, more flexible countermeasures against image distortion and the like can be taken. For example, formats of documents or the like to be utilized within a company (intra-company documents) are often not very important in many cases. When the formats are not important in this way, a relatively large possible shrink amount may be able to be set. Conversely, since formats of documents or the like to be provided outside a company (external documents) are often very important in many cases, a shrink amount may be set to 0 or some relatively small permissible shrink amount.

Whether to perform the special control may be determined in part depending on a temperature detected by the heater thermometer 62. That is, the control unit 160 performs only normal control when the temperature is less than some value A % (for example, 50%) of a predetermined temperature threshold at which further electrical conduction to the heating body group 45 will be blocked (shutdown). On the other hand, the control unit 160 may control to switch to special control when the temperature is equal to or greater than some value B % (where A<B; for example, B %=70%) of the predetermined temperature threshold. Even when the control of the switching can be performed, it is not preferable to switch the control manner during the same print job. This is because the format of the images being formed during the job may be switched halfway and thus any format changes might be more obvious to a user.

A user may be able to select whether the special control can be or should performed. In this case, for example, a selection screen by which a user can select the control type may be provided. When the user specifically selects to perform the special control on the selection screen, the control unit 160 will perform the special control.

Figure 16:
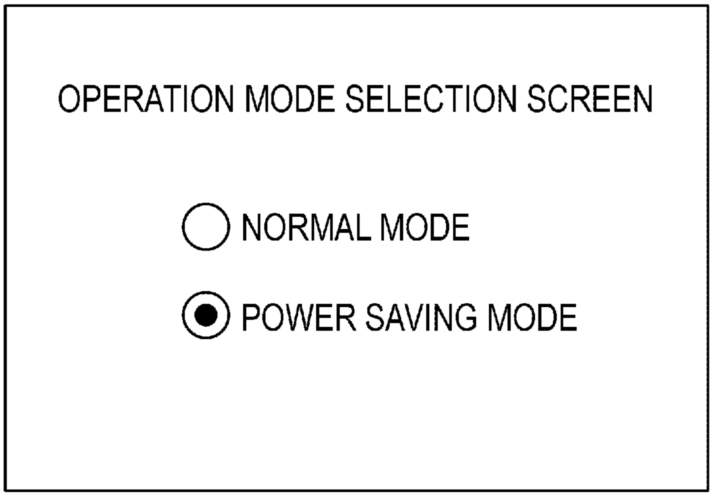
FIG. 16 is a diagram illustrating a selection screen.

The control unit 160 may associate an operation mode of the image forming apparatus 100 with whether to perform the special control or not and perform control according to the operation mode. For example, the image forming apparatus 100 is assumed to have a normal mode and a power saving mode in which power consumption is lower than in the normal mode. At this time, the control unit 160 may operate to display the selection screen by which a user can select between the normal mode and the power saving mode. FIG. 16 is a diagram illustrating a selection screen. The selection screen is displayed on the display 110. On the selection screen, the user can select either one of the normal mode and the power saving mode using a radio button.

The control unit 160 performs the special control when the power saving mode is selected on the selection screen.

The special control is control that has an influence on an appearance of an image. For that reason, the user may not want to prefer the special control. In such a case, it is effective to perform the control by allowing the user to select whether the special control is performed or associating an operation mode.

While certain embodiments have been described these embodiments have been presented by way of example only, and are not intended to limit the scope of the inventions. Indeed, the novel embodiments described herein may be embodied in a variety of other forms; furthermore various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. An image forming apparatus, comprising:

an image forming device configured to perform image forming based on image data;

an image fixing device including a plurality of heater elements, which includes a first heater element; and a controller configured to:

shrink at least a part of an image to be formed based on the image data based on a position of the image to be formed relative to a position of the heater elements, control the image forming device to form the shrunk image on a sheet, and cause a part of the heater elements, not the first heater element, to be turned on to fix the shrunk image formed on the sheet.

2. The image forming apparatus according to claim 1, wherein the image without shrink overlaps the first heater element, and the shrunk image does not overlap the first heater element.

3. The image forming apparatus according to claim 1, wherein the plurality of heater elements includes a second heater element, and the second heater element is also not turned on during fixing of the shrunk image formed on the sheet.

4. The image forming apparatus according to claim 3, wherein the image without shrink overlaps the first and second heater elements, and the shrunk image overlaps neither the first nor the second heater element.

5. The image forming apparatus according to claim 1, wherein the controller is configured to shrink the part of the image to be formed, and not entirety of the image formed, based on the position of the image to be formed relative to the position of the heater elements, the part of the image including a blank region.

6. The image forming apparatus according to claim 1, wherein the controller is configured to shrink entirety of the image based on the position of the image to be formed relative to the position of the heater elements.

7. The image forming apparatus according to claim 1, wherein the controller is configured to shrink the image to be formed when the number of the heater elements to be turned on for image fixing becomes less by shrinking the image to be formed.

8. The image forming apparatus according to claim 1, wherein the image forming device forms the shrunk image on the sheet with toner.

9. The image forming apparatus according to claim 1, wherein the image forming apparatus is configured to operate in a normal mode and a power saving mode, and the controller is configured to perform shrink of the image to be formed during the power saving mode and not during the normal mode.

10. The image forming apparatus according to claim 1, wherein the controller is further configured to shift the image to be formed based on the position of the image to be formed relative to the position of the heater elements, and control the image forming device to form the shrunk and shifted image on the sheet.

11. The image forming apparatus according to claim 10, wherein the image without shrink and shift overlaps the first heater element, and the shrunk and shifted image does not overlap the first heater element.

12. The image forming apparatus according to claim 10, wherein the plurality of heater elements includes a second heater element, and the second heater element is also not turned on during fixing of the shrunk and shifted image formed on the sheet.

13. The image forming apparatus according to claim 12, wherein the image without shrink and shift overlaps the first and second heater elements, and the shrunk and shifted image overlaps neither the first nor the second heater element.

14. The image forming apparatus according to claim 10, wherein the controller is configured to shift the image to be formed when the number of the heater elements to be turned on for image fixing becomes less by shifting the image to be formed.

15. An image forming apparatus, comprising:

an image forming device configured to perform image forming based on image data;

an image fixing device including a plurality of heater elements, which includes a first heater element; and a controller configured to:

shift the image to be formed based on a position of the image to be formed relative to a position of the heater elements, control the image forming device to form the shifted image on a sheet, and cause a part of the heater elements, not the first heater element, to be turned on to fix the shifted image formed on the sheet.

16. The image forming apparatus according to claim 15, wherein the image without shift overlaps the first heater element, and the shifted image does not overlap the first heater element.

17. The image forming apparatus according to claim 15, wherein the plurality of heater elements includes a second heater element, and the second heater element is also not turned on during fixing of the shifted image formed on the sheet.

18. The image forming apparatus according to claim 17, wherein the image without shift overlaps the first and second heater elements, and the shifted image overlaps neither the first nor the second heater element.

19. The image forming apparatus according to claim 15, wherein the controller is configured to shift the image to be formed when the number of the heater elements to be turned on for image fixing becomes less by shifting the image to be formed.

20. The image forming apparatus according to claim 15, wherein the image forming apparatus is configured to operate in a normal mode and a power saving mode, and the controller is configured to perform shift of the image to be formed during the power saving mode and not during the normal mode.

* * * * *